United States Patent [19]

Holt et al.

[11] Patent Number: 4,803,727
[45] Date of Patent: Feb. 7, 1989

[54] TRANSMISSION SYSTEM

[75] Inventors: Christopher E. Holt; John M. Rollett, both of Ipswich, England

[73] Assignee: British Telecommunications public limited company, Great Britain

[21] Appl. No.: 124,512

[22] Filed: Nov. 24, 1987

[30] Foreign Application Priority Data

Nov. 24, 1986 [GB] United Kingdom ............ 8628046

[51] Int. Cl.$^4$ .............................................. H04S 1/00
[52] U.S. Cl. ................................................ 381/1; 381/2
[58] Field of Search ............... 381/1, 2, 3, 4, 5, 7, 381/29, 30, 31; 370/118; 360/8, 22, 23; 369/86; 358/144

[56] References Cited

U.S. PATENT DOCUMENTS

| | | | |
|---|---|---|---|
| 3,046,329 | 7/1962 | Reesor | 381/14 |
| 3,240,878 | 3/1966 | Dome | 381/14 |
| 3,976,842 | 8/1976 | Hoyt | 381/34 |
| 4,181,822 | 1/1980 | Workman | 360/23 |
| 4,246,615 | 1/1981 | Shiraishi et al. | 360/8 |
| 4,309,722 | 1/1982 | Palmer | 369/86 |
| 4,388,654 | 6/1983 | Mehrotra | 369/86 |
| 4,406,001 | 9/1983 | Klasco | 381/34 |
| 4,509,185 | 4/1985 | Grunberg | 381/34 |
| 4,534,054 | 8/1985 | Maisel | 381/14 |
| 4,538,234 | 8/1985 | Honda et al. | 381/31 |
| 4,575,773 | 3/1986 | Dymond et al. | 360/8 |
| 4,608,456 | 8/1986 | Paik et al. | 381/1 |
| 4,630,298 | 12/1986 | Polk et al. | 381/24 |
| 4,638,506 | 1/1987 | Han | 381/34 |
| 4,682,248 | 7/1987 | Schwartz | 360/8 |
| 4,692,818 | 9/1987 | Fujibayashi | 360/22 |
| 4,712,240 | 12/1987 | Araseki | 381/31 |
| 4,723,285 | 2/1988 | Le Roy et al. | 358/144 |

FOREIGN PATENT DOCUMENTS

| | | |
|---|---|---|
| EP-A-O 145 332 | 6/1985 | European Pat. Off. . |
| WO85/00686 | 2/1985 | PCT Int'l Appl. . |
| 540185 | 10/1941 | United Kingdom . |
| 945546 | 1/1964 | United Kingdom . |
| 970051 | 9/1964 | United Kingdom . |

OTHER PUBLICATIONS

"On The Design of Sub-Band Coders for Low-Bit-Rate Speech Communication", The Bell System Technical Journal, vol. 56, No. 5, May/Jun. 1977, pp. 747-769, New York, U.S.; R. E. Crochiere, *p. 748, line 12-p. 750, line 15; FIS. 1, 2.

Primary Examiner—Forester W. Isen
Attorney, Agent, or Firm—Nixon & Vanderhye

[57] ABSTRACT

A stereo coding system is described in which 7 kHZ bandwidth sum (L+R) and difference (L−R) signals are converted to digital form (11 and 12). The difference signal is then bandlimited (13) to 2 kHZ and downsampled (14) to 4K samples/sec prior to being encoded (16), and the sum signal is encoded (15); both are then multiplexed together (17) prior to transmission. After reception, the signal is demultiplexed (19) and the difference signal is decoded (20) upsampled (21) to its original bit rate and filtered to prevent aliasing (22), and the sum signal is delayed in a digital buffer (28) and decoded (24) prior to both being converted back to analogue form (23 and 25). The delay introduced by the digital buffer (28) equalizes the excess delay introduced into the difference signal.

17 Claims, 5 Drawing Sheets

TRANSMISSION SYSTEM

This invention relates to a transmission system for audio signals; and a transmitter and receiver for use in such a system.

UK Pat. No: 970,051 describes a known stereo coding system (illustrated in FIG. 1) which derives sum L+R and difference L−R signals from the left LI/P and right RI/P inputs, for example using interconnected adders 1 and 2. The sum channel carries the sum signal—a monaural signal; and the difference channel carries the information that determines the relative phase and magnitude of the two outputs.

The human listener utilizes both phase and amplitude information to localize sounds. It is known that the relative phase of the signals reaching the ears is significant up to about 1kHz; whilst the relative amplitudes of the left and right signals are significant up to about 10 kHz.

Figure 1:
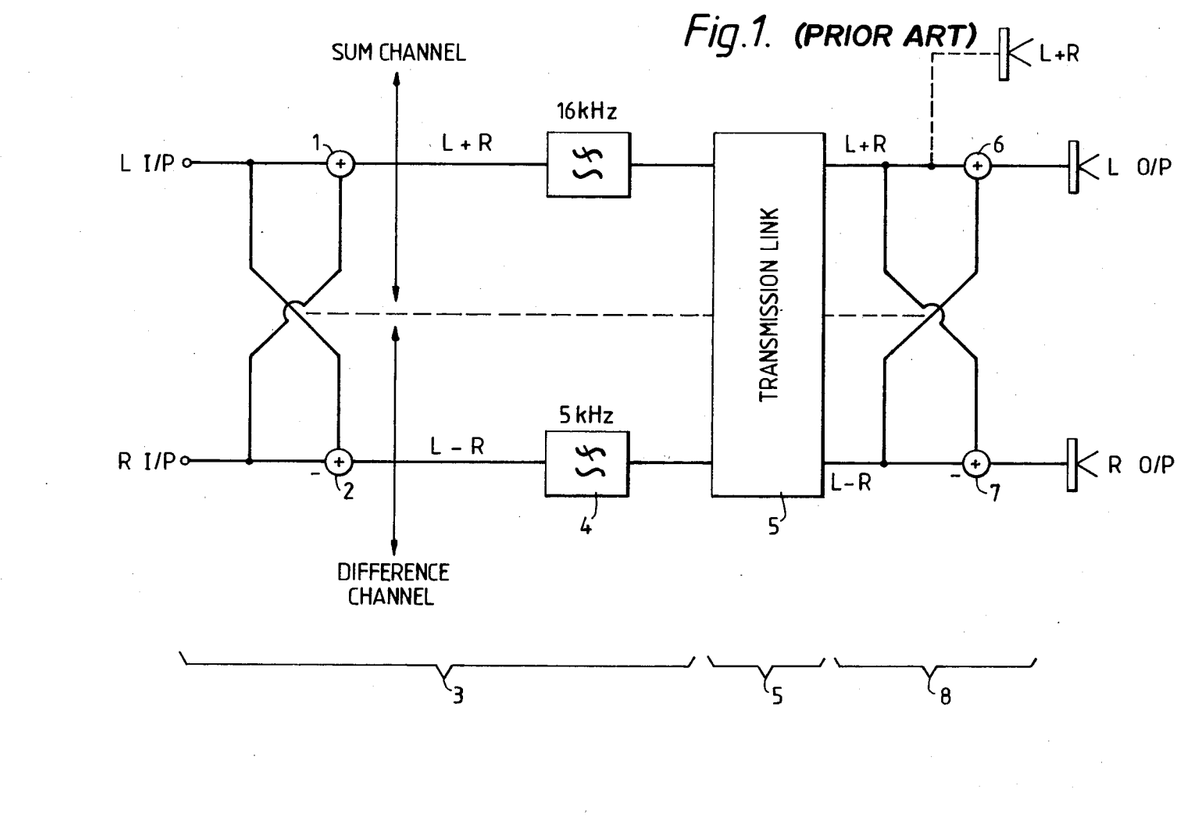
FIG. 1 illustrates a prior art arrangement.

If, in the transmitter 3, the difference signal is band-limited, say to 5 kHz as suggested in the above mentioned UK Patent, by the use of a low-pass analogue filter 4, the majority of the useful localisation (phase and amplitude) information is retained, and a substantial reduction in the transmission link 5 bandwidth is achieved. When the sum and difference signals are mixed, 6 and 7, at the receiving end 8 to recreate the "left" and "right" signals the brain can compensate for the lost information in the difference channel and still form a stereophonic image.

The main disadvantage of such band-limiting systems is that the band-limiting low-pass filter introduces phase distortion into the difference signal relative to the sum signal, resulting in loss of stereo information. The use of analogue filters to provide a corresponding phase compensation into the sum signal is difficult to achieve accurately and causes, in turn, the introduciton of noise into that signal's amplitude which leads to degradation of the system performance.

According to a first aspect of the present invention there is provided a transmission system for audio signals in which at a transmitter: a monophonic signal and a difference signal are derived from left and right input signals, a digital version of the difference signal is band-limited to a predetermined bandwidth smaller than that of the monophonic signal, the sampling rate of the digital bandlimited difference signal is reduced, and the monophonic and resulting difference signals are transmitted to a receiver; and in which at a receiver: upon reception, the sampling rate of the digital difference signal is increased, frequencies above the predetermined bandwidth in the difference signal are attenuated, and left and right output signals are derived from the monophonic and resultant difference signals; and in which, either at the transmitter or receiver, compensation for the differential delays in the monophonic and difference signals is introduced.

According to a second aspect of the invention there is provided a transmitter for use in a transmission system according to the first aspect comprising: a means for receiving left and right input signals, and for forming a monophonic signal and a digital difference signal therefrom; a digital filter for bandlimiting the digital difference signal to a predetermined bandwidth smaller than that of the monophonic signal; and a downsampler for reducing the sampling rate of the filtered difference signal.

According to a third aspect of the invention there is provided a receiver for use in a transmission system according to the first aspect comprising: receiving means for receiving monophonic signals, and for receiving digital difference signals having a predetermined maximum bandwidth less than that of the monophonic signals; an upsampler for increasing the sampling rate of the difference signals; a digital filter for attenuating frequencies above the said predetermined maximum bandwidth in the unsampled difference signal; and digital-to-analogue conversion and mixing means for forming analogue left and right output signals from the monophonic and resultant difference signals.

According to a fourth aspect of the invention there is provided a transmission apparatus for stereophonic audio signals comprising: means for forming monophonic and difference signals from left and right input signals; means for bandlimiting the difference signal to substantially 2 kHz; and means for transmitting the monophonic and difference signals.

It has been found that acceptable results can be obtained when the difference signal is bandlimited to 2 kHz when the invention is exercised since the maximum amount of phase information is preserved in the remaining frequency range.

The compensating means, for compensating differential delays in the sum and difference signals, is preferably included in the receiver. And since the overall delay is usually greater in the difference channel the compensating means is usually included in the sum channel. Delay compensation is advantageously performed digitally, say by a digital buffer, so the sum signal is often also coverted to digital form, either in the transmitter or receiver.

This invention will now be described by way of example with reference to FIGS. 2 to 4 of the accompanying drawings in which.

Figure 2:
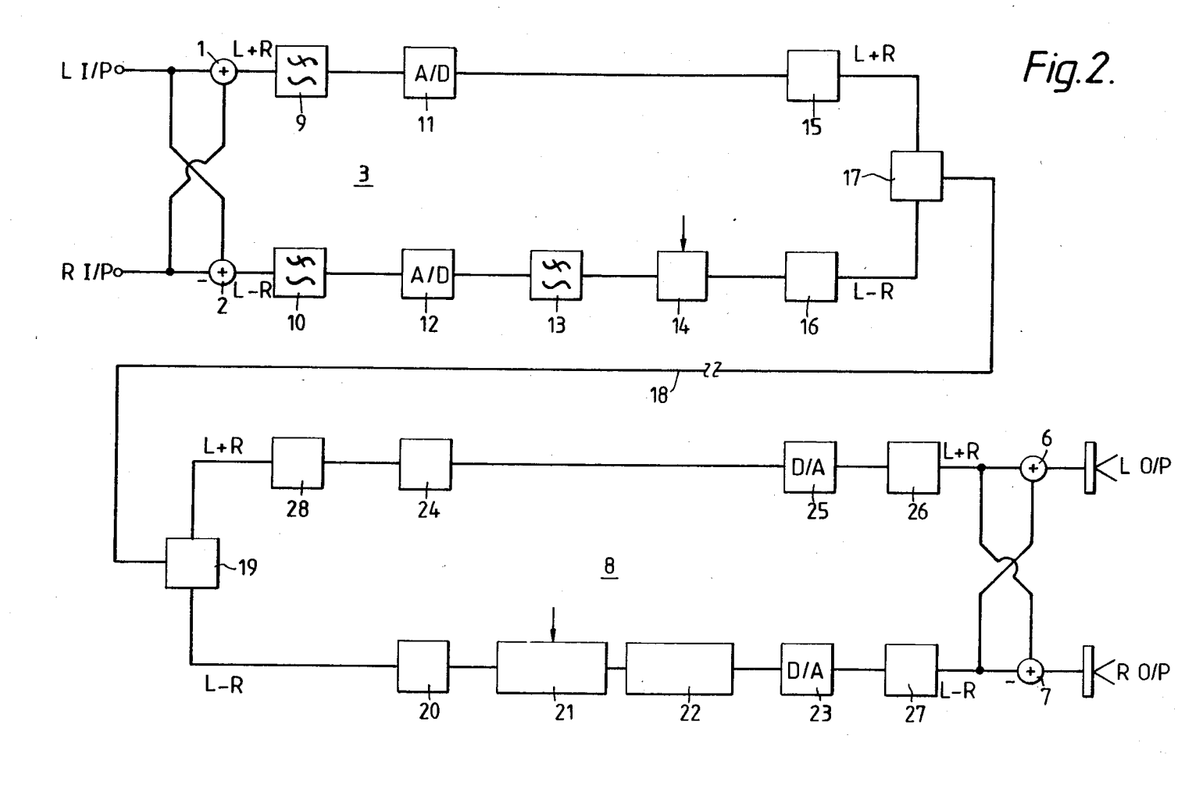
FIG. 2 illustrates a block diagram of a system embodying the invention.

Referring now to FIG. 2, sum L+R and difference L−R signals are again derived, using interconnected adders 1 and 2, from the left and right input signals at the front end of the transmitter 3. Both sum and difference signals are then filtered to, say, a bandwidth of 7 kHz by analogue filters, 9 and 10—which are preferably identical so as not to introduce differential delays—before being digitized, with a sampling rate of 16k samples/sec, in analogue-to-digital converters 11 and 12 (although of course the filters could precede the interconnected adders 1 and 2).

The digital difference signals is then band-limited, to say 2 kHz, by a digital low pass filter 13, which preferably has a delay characteristic independent of frequency. The band-limited difference signal is then down-sampled to a sampling rate of 4k samples/sec in down sampler 14. This bit rate reduction is possible because the nyquist frequency of the difference signal has been reduced to 4 kHz by the band limiting.

The sum and difference signals are then coded by digital coders 15 and 16 in conventional fashion, e.g. using adaptive differential pulse code modulation (ADPCM). The sum and difference signals may then be multiplexed together in multiplexer 17 before transmission over the digital transmission link 18 to a receiver. At the receiver 8 the received digital signal may be demultiplexed in demultiplexer 19 to obtain the digital sum and difference signals; these are then processed in separate channels.

The difference signal is decoded by decoder 20 to produce the 2 kHz band-limited digital difference signal. This signal is then up-sampled back to its original bit rate in upsampler 21 and filtered by a low-pass (2 kHz cut-off) filter 22 to avoid aliasing. The difference signal is then converted to analogue form by digital-to-analogue converter 23.

Meanwhile the sum signal is decoded in decoder 24 and converted to analogue form by digitial-to-analogue converter 25. Both sum and difference signals are filtered separately, but preferably identically, by low-pass filters 26 and 27 prior to mixing (6 and 7) to produce "left" and "right" outputs.

The coder and decoder differ in their treatment of the sum and difference signals in that the difference signals are band limited, down-sampled, upsampled and filtered to remove aliasing.

All these processing steps take place while the sum and difference signals are in digital form. It is relatively easy to construct digital filters having a constant delay response, so that the resultant relative delay, due to the bandlimiting of the difference signal, and any other delays can be compensated for by a digital delay 28 in the sum channel path (or the other channel if appropriate) at any point where the sum signal is in digital form, but preferably between the demultiplexer 19 and decoder 24 in the receiver 8. The digital delay 28 may be realised in known fashion to introduce the precise amount of delay required to equalize the overall delays of both channels without corrupting the signals in any other way.

The "left" and "right" outputs are only true stereo in the 0–2 kHz frequency range, outside this range the two output signals are identical. For this reason the sum signal need not in fact be a sum L+R singal above 2 kHz, but may be any monophonic representation of the input or the left or right input signal alone, in this frequency range.

Figure 3:
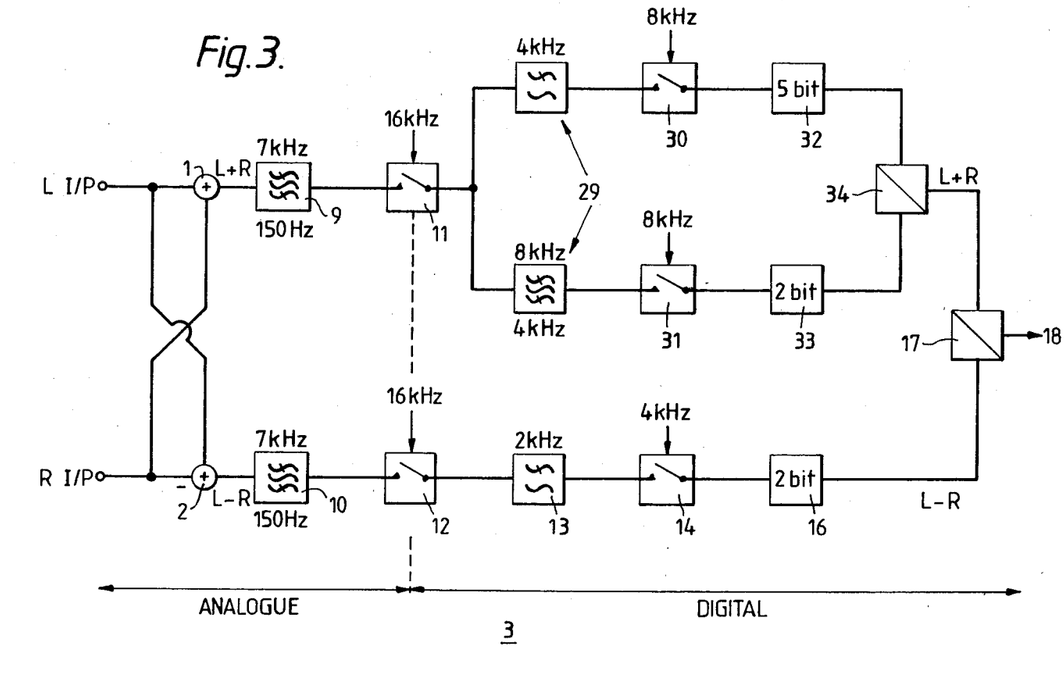
FIG. 3 illustrates the coder as used in a preferred embodiment of the invention.
Figure 4:
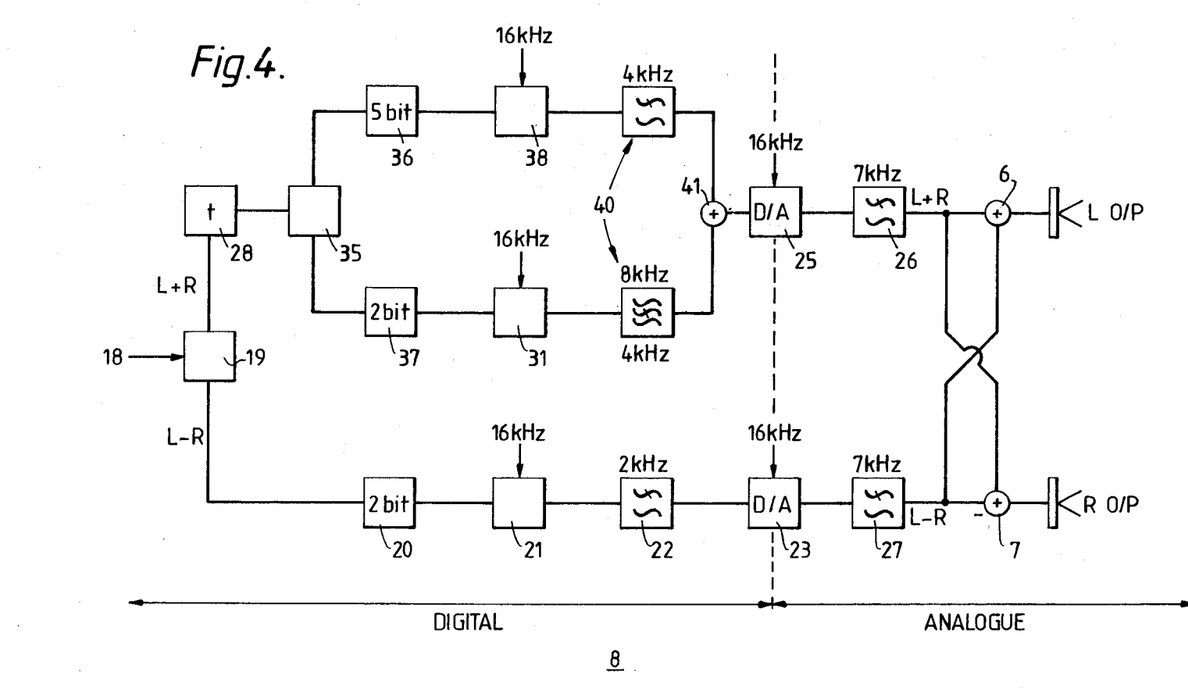
FIG. 4 illustrates a decoder as used in a preferred embodiment of the invention.

Referring now to FIGS. 3 and 4, a second embodiment of the invention is shown in which stereo input signals are encoded so as to be transmitted over a standard 64 kbit/s digital link. The link (which is the subject of a draft CCITT standard) utilises 56 kbit/s for a speech channel using two-band sub-band coding plus ADPCM, multiplexed with an 8 kbit/s side-channel. The same reference numerals as in FIG. 2 have been used to designate corresponding elements of the system.

In the coder, FIG. 3, sum and difference signals are again derived and processed by identical analogue filters 9 and 10 to produce signals having a bandwidth from 150 Hz to 7 kHz. Both are then converted to digital form by analogue-to-digital converters 11 and 12, having a sampling frequency of 16 kHz. The 7 kHz signal band digital difference signal is then band limited by a digital low pass filter 13 to 2 kHz. The difference signal is then downsampled to 4k samples/sec 14 and encoded using two-bit ADPCM 16 to produce an 8 kbit/sec difference signal.

The sum signal, after conversion to digital form, is split into two 4 kHz channels (0–4 kHz and 4–8 kHz) by a pair of mirror filters 20, and each channel downsampled to 8k samples/sec by downsamplers 30 and 31 respectively. The sum signals are coded and using 5 bit and 2 bit ADCPM coders 32 and 33 respectively to produce a 40 kbit/sec and a 16 kbit/sec signal which are multiplexed together 34 to produce a 56 kbit/sec sum signal.

The encoded sum and difference signals are then multiplexed together 17 to provide a 64 kbit/sec signal. The combined signal is formatted as a series of 8-bit bytes each containing 5 bits sum signal/lower sub-band, 2 bits sum signal/upper sub-bands and one bit difference signal.

At the decoder, FIG. 4, the received 65 kbit/sec signal is demultiplexed 19 to provide the 56 kbit/sec sum signal and the 8 kbit/sec difference signal. The difference signal is then decoded in ADPCM decoder 20 to provide a signal at 4k samples/sec which is upsampled to 16k samples/sec 21 and filtered by a 2 kHz cut-off low pass filter 22 to remove aliasing.

The sum signal is delayed by a time t in buffer 28 and demultiplexed again 35 to provide a 40 kbits/s and a 16 kbits/s signal to 5 bit and 2 bit decoders, 36 and 37, respectively which produce two 4 kHz bandwidth sum signals.

These are upsampled to 16K samples/sec, 38 and 39 and are filtered by mirror filters 40 to provide two 4 kHz bandwidth signals representing the bands 0–4 kHz and 4–8 kHz. These are combined 41 to provide a sum signal to the digital-to-analogue converter 25.

The sum and difference signals are then processed in analogue form by identical filters 26 and 27 before mixing to reproduce the left and right outputs. The delay t introduced into the sum signal path is adjusted to equal the extra end-to-end delay introduced into the difference signal by the extra digital processing it undergoes, less any additional delay to the sum channel due to the sub-band coding/decoding.

The hardware and firmware required to implement the digital processing of this coding system may be reduced by timesharing between the sum and difference channels. In particular the filters 13 and 29 in the coder, and 22 and 40 in the decoder can share time between the left and right channels; and the coders 16,32 and 33 in the transmitter and decoders 21,38 and 39 in the receiver can share time.

It should be appreciated that although the invention has been described with reference to stereo audio transmission systems it is also applicable to quadrophonic and other multiple channel audio systems.

Figures 5, 5A:
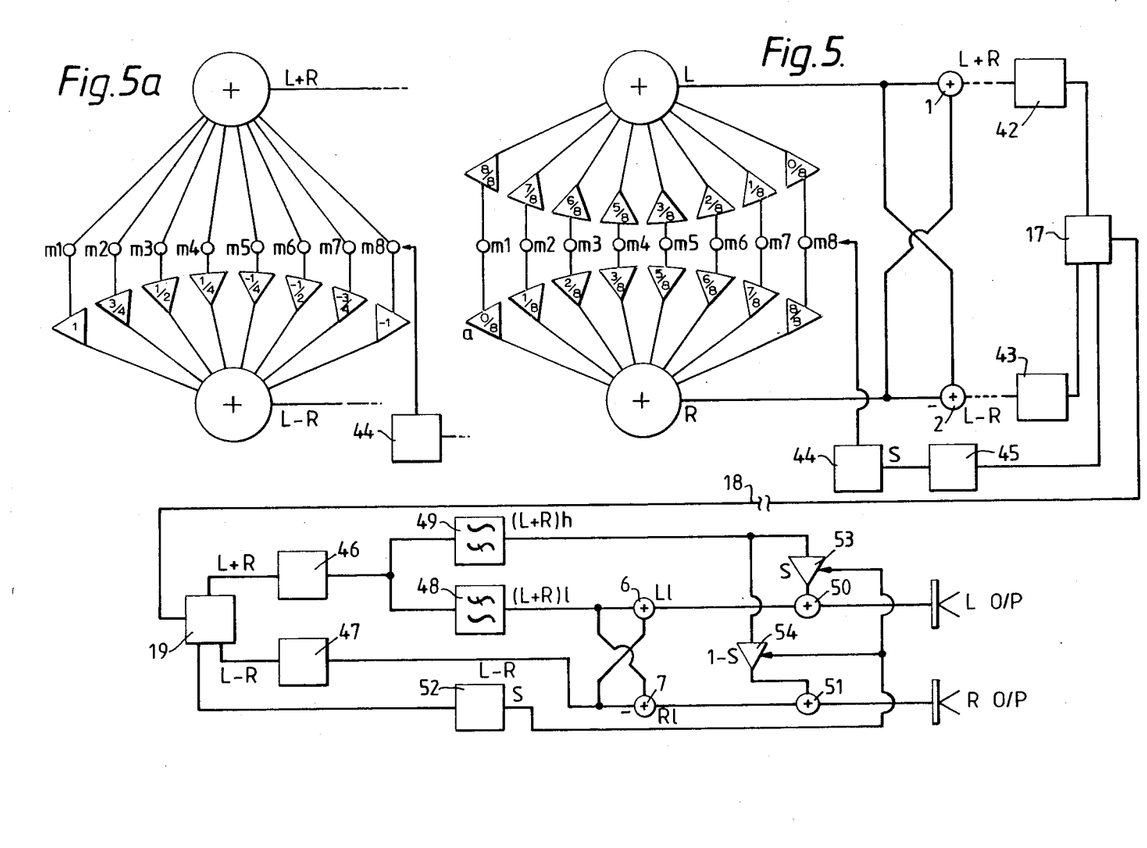
FIG. 5 illustrates a block diagram of another system embodying the invention.
FIGS. 5a illustrates an alternative input weighting scheme for the system shown in FIG. 5.

The effects of the loss of stereo information in the range 2–7 kHz, although not particularly significant, can be mitigated by adjusting the instantaneous power ratio (balance) of the left and right output signals in this range to create a pseudo-stereo effect. The power ratio in this range is usually 50:50 and the adjustment is made by amplifying one (either the left or right) output signal and attenuating the other by a corresponding amount. The degree of adjustment may be controlled to ensure that the resulting power ratio in this frequency range is the same as the power ratio of the left and right output signals in the 0–2 kHz range (where there is true stereo). Alternatively a data signal carrying information about the degree of adjustment desired may be sent from the transmitter along with the sum and difference signals. This data signal may be generated at the transmitter from information about the relative positions of sound sources. For example, referring to FIG. 5, if the source of sound is eight speakers at an audio conference terminal each equipped with a throat microphone M1-M8 then the transmitter codes the eight inputs into stereo sum and difference signals by weighting the inputs from the microphones M1-M8 by different factors (an equivalent weighting scheme is shown in FIG. 5a). The sum and difference signals are then coded 42,43 including bandlimiting the difference signal to 2 kHz as described above, before transmission. However, in addition the transmitter comprises activity detection means 44 which determines the current mean position of the sound inputs from the eight microphones, and this is used to generate a data signal carrying information about the degree of sound balance of the input signals. The data signal is then coded 45 and multiplexed with the sum and difference signals 17 before being transmitted to the receiver.

At the receiver the received signal is demultiplexed 19 into the coded sum, difference and data signals. The sum and difference signals are decoded are previously described, 46,47, to produce an analogue sum signal of 7 kHz bandwidth and an analogue difference signal of 2 kHz bandwidth. The sum signal is split into a low band signal (L+R)l by a low-pass filter 48 having a cut-off frequency of 2 kHz (ie equal to the bandwidth difference signal), and into a high-band signal (L+R)h by a band pass filter 49 having a pass band of 2-7 kHz (ie the remainder). The low band sum signal (L+R)l and the difference signal are then mixed together in adders 6 and 7 to provide true stereo left L1 and R1 outputs of bandwidth 2 kHz. The high band sum signal (L+R)h is then reintroduced, in adders 50 and 51, to the stereo signals.

Meanwhile, the coded data signal derived from the demultiplexer 19 is then decoded 52 to produce the data signal S. This signal is applied to amplifiers 53 and 54 to control the amplification/attenuation factor of each in reciprocal fashion so that the high band sum signal (L+R)h is reintroduced in the desired ratio. The "left" and "right" outputs in the range 0-2 kHz from the adders 50 and 51 will then still be true stereo, but in the range 2-7 kHz will be the sum signal with appropriately adjusted balance.

We claim:

1. A transmission system for audio signals in which at a transmitter: a monphonic signal and a difference signal are derived from multiple input signals, a digital version of the difference signal is bandlimited to a predetermined bandwidth smaller than that of the monophonic signal, the sampling rate of the digital bandlimited difference signal is reduced; and the monophonic and resulting difference signals are transmitted to a receiver; and in which at a receiver: upon reception, the sampling rate of the digital difference signal is increased, frequencies above the predetermined bandwidth in the difference signal are attenuated, and left and right output signals are derived from the monophonic and resultant difference signals; and in which, either at the transmitter or receiver, compensation for differential delays in the monophonic and difference signals is introduced.

2. A transmitter for use in a transmission system according to claim 1, comprising: a means for receiving said multiple input signals, and for forming said monophonic signal and said digital difference signal therefrom; a digital filter for bandlimiting the digital difference signal to a predetermined bandwidth smaller than that of the monophonic signal; and a downsampler for reducing the sampling rate of the filtered difference signal.

3. A transmitter according to claim 2, further comprising compensating means for compensating differential delays in the monophonic and difference signals.

4. A transmitter according to claim 3, further comprising analogue-to-digital converter means for providing the monophonic signal in digital form, wherein the compensating means is a digital delay for introducing a delay into the monophonic signal.

5. A transmitter according to claim 4 further comprising two identical analogue filters for filtering the monophonic and difference signals prior to conversion to digital form.

6. A transmitter according to claim 4 or 5 wherein both the digitial monophonic and difference signals are provided at the same sampling rate.

7. A transmitter according to any one of claims 2, 3, 4 or 5 wherein the said predetermined bandwidth is substantially 2 kHz.

8. A transmitter according to any one of claims 2, 3, 4 or 5 further comprising means for determining which of the multiple input signals is currently the dominant source of sound and means for generating a data signal carrying information about the adjustment of the power ratio of the left and right output signals to be performed in the frequency range above said predetermined maximum bandwidth.

9. A receiver for use in a transmission system according to claim 1, comprising: receiving means for receiving monophonic signals, and for receiving digital difference signals having a predetermined maximum bandwidth less than that of the monophonic signals; an upsampler for increasing the sampling rate of the difference signals; a digital filter for attenuating frequencies above the said predetermined maximum bandwidth in the upsampled difference signal; and digital-to-analogue conversion and mixing means for forming analogue left and right output signals from the monophonic and filtered upsampled difference signals.

10. A receiver according to claim 9 comprising compensating means for compensating differential delays in the monophonic and difference signals.

11. A receiver according to claim 10 wherein the monophonic signal is also received in digital form and the compensating means is a digital delay for introducing a delay into the monophonic signal.

12. A receiver according to claim 11 further comprising two identical analogue filters for filtering the left and right output signals.

13. A receiver according to any one of claims 9 to 12 wherein the said predetermined maximum bandwidth is substantially 2 kHz.

14. A receiver according to claim 11 or 12 wherein the upsampled difference signal and the received monophonic signal have the same sampling rate.

15. A receiver according to any one of claims 9, 10, 11 or 12 also comprising means for adjusting the power ratio of the left and right output signals in the frequency range above said predetermined maximum bandwidth in accordance with the relative power of the left and right output signals in the frequency range below said predetermined maximum bandwidth.

16. A receiver according to any one of claims 9, 10, 11 or 12 also comprising means for adjusting the power ratio of the left and right output signals in the frequency range above said predetermined maximum bandwidth in accordance with information carried in a received data signal.

17. A transmission apparatus for stereophonic audio signals comprising: means for forming monophonic and difference signals from left and right input signals; means for bandlimiting the difference signal to substantially 2 kHz; and means for transmitting the monophonic and difference signals.

* * * * *

UNITED STATES PATENT AND TRADEMARK OFFICE
CERTIFICATE OF CORRECTION

PATENT NO. : 4,803,727

DATED : 7 February 1989

INVENTOR(S) : Christopher E. Holt and John M. Rollett

It is certified that error appears in the above-identified patent and that said Letters Patent is hereby corrected as shown below:

Col. 5, line 48, change "monphonic" to --monophonic--.

Signed and Sealed this

Seventh Day of November, 1989

*Attest:*

JEFFREY M. SAMUELS

*Attesting Officer*     *Acting Commissioner of Patents and Trademarks*